(12) United States Patent
Dudek et al.

(10) Patent No.: US 7,427,220 B2
(45) Date of Patent: Sep. 23, 2008

(54) AMPHIBIOUS ROBOTIC DEVICE

(75) Inventors: Greg Dudek, Westmount (CA); Chris Prahacs, Montreal (CA); Shane Saunderson, Montreal (CA); Philippe Giguere, Montreal (CA); Junaed Sattar, Montreal (CA); Michael Jenkin, 337 Glencalrn Avenue, Toronto (CA) M5N 1T8

(73) Assignees: McGill University, Montreal (CA); Michael Jenkin, Toronto (CA)

( * ) Notice: Subject to any disclaimer, the term of this patent is extended or adjusted under 35 U.S.C. 154(b) by 0 days.

(21) Appl. No.: 11/497,302

(22) Filed: Aug. 2, 2006

(65) Prior Publication Data
US 2008/0032571 A1  Feb. 7, 2008

(51) Int. Cl.
*B63H 21/22* (2006.01)
(52) U.S. Cl. .......................... 440/1; 440/12.5
(58) Field of Classification Search ............ 440/1, 440/12.5
See application file for complete search history.

(56) References Cited

U.S. PATENT DOCUMENTS

| | | | |
|---|---|---|---|
| 5,337,434 A * | 8/1994 | Erlich ........................ | 15/1.7 |
| 6,058,847 A | 5/2000 | Adams | |
| 6,089,178 A | 7/2000 | Yamamoto et al. | |
| 6,179,683 B1 | 1/2001 | Pell et al. | |
| 6,250,585 B1 | 6/2001 | Pell | |
| 6,481,513 B2 | 11/2002 | Buehler et al. | |
| 6,647,853 B2 | 11/2003 | Hickey | |
| 6,974,356 B2 | 12/2005 | Hobson et al. | |
| 7,007,626 B2 | 3/2006 | Hobson et al. | |
| 2001/0006334 A1 * | 7/2001 | Suzuki ...................... | 318/568.1 |
| 2002/0024312 A1 * | 2/2002 | Takagi .................... | 318/568.12 |
| 2003/0208303 A1 * | 11/2003 | Okamoto et al. ............ | 700/245 |
| 2005/0235898 A1 * | 10/2005 | Hobson et al. .............. | 114/312 |

OTHER PUBLICATIONS

Fiala, M., ARTag Revision 1.A Fiducial Marker System Using Digital Techniques, National Research Council Canada NRC/ERB-1117, Nov. 24, 2004 46 pages, Canada.

Slashdot, Swimming Cockroach Robot Developed, Jun. 12, 2003 Website: http://science.slashdot.org/article.pl?sid=03/06/12/0156220&mode=nested&t\%20id=126.

Georgiades, C. et al, Aqua: An Aquatic Walking Robot, Proceedings of IROS 2004, Sendai, Japan.

(Continued)

*Primary Examiner*—Stephen Avila
(74) *Attorney, Agent, or Firm*—Ogilvy Renault LLP

(57) ABSTRACT

A control system for a robotic device maneuverable in at least a liquid medium, the system having at least one visual sensor retrieving an image of the device's environment, an image analyzing module receiving the image, determining a presence of an object of a given type therein and analyzing at least one property of the object, a motion calculator determining a desired motion of the device based on the property, and a controller operating a propulsion system of the device to obtain the desired motion. Also, a legged robotic device having a control system including at least one sensor providing data about an environment of the device, the control system using sensor data to determine a desired motion of the device, determining a corresponding required leg motion of each of the legs to produce the desired motion and actuating the legs in accordance with the corresponding required leg motion.

22 Claims, 12 Drawing Sheets

OTHER PUBLICATIONS

Curran, P., Aqua Robot Could Splash Into Space, The Gazette, Jan. 29, 2004, Montreal Website: http://www.cim.mcqill.ca/~dudek/Gazeete_AQUA/www.canada.com/montreal/montrealgazette/columnists/stort1.html.

Prahacs, C. et al, Towards Legged Amphibious Mobile Robotics, Jul. 29, 2004.

Georgiades, C. et al, The AQUA Aquatic Walking Robot, Aug. 2004.

Saunderson, S. et al, Amphibious AQUA, Poster, McGill University, Apr. 2005.

Jenkin, M. et al, AQUA: An Amphibious Walking & Swimming Robot, Poster, Mcgill University, Oct. 2004.

Saunderson, S. et al, Amphibious AQUA Design, McGill University, Apr. 2005.

Théberge, M., Making Waves, McGill News, Jul. 2005 Website: http://www.mcgill.ca/news/2005/summer/aqua/.

Sattar, J. et al, A Visual Servoing System for an Aquatic Swimming Robot, Proceedings of IROS 2005, Aug. 2, 2005, Edmonton, Alberta, Canada, pp. 2071-2076.

Dudek, G. et al., A Visually Guided Swimming Robot, Proceedings of IROS 2005, Aug. 2, 2005, Edmonton, Alberta, Canada, pp. 1749-1754.

Sattar, J., A Visual Servoing System for an Amphibious Legged Robot (Master's Thesis), McGill University, Aug. 2005.

Sattar, J. et al, On the performance of color Tracking Algorithms for Underwater Robots under Varying Lighting and Visibility, Proceedings of the IEEE International Conference on Robotics and Automation (ICRA06), Orlando, Florida, May, 2006.

Theberge, M. et al, Gone Swimmin', IEEE Spectrum, Jun. 2006 Website: http://www.spectrum.ieee.org/print/3641.

Dudek, G. et al, Sensor Based Behavior Control for an Autonomous Underwater Vehicle, Proceedings of the International Symposium on Experimental Robotics (ISER), Rio de Janeiro, Brazil, Jul. 2006.

Project AQUA, Dalhousie University, 2003 Website: http://flame.cs.dal.ca/~aqua/.

RHex The Compliant Hexapod Robot Website: http://rhex.net/.

Ambulatory Robotics Lab, Centre for Inteligent Machines Website: http://www.cim.mcgill.ca/~artweb/.

* cited by examiner

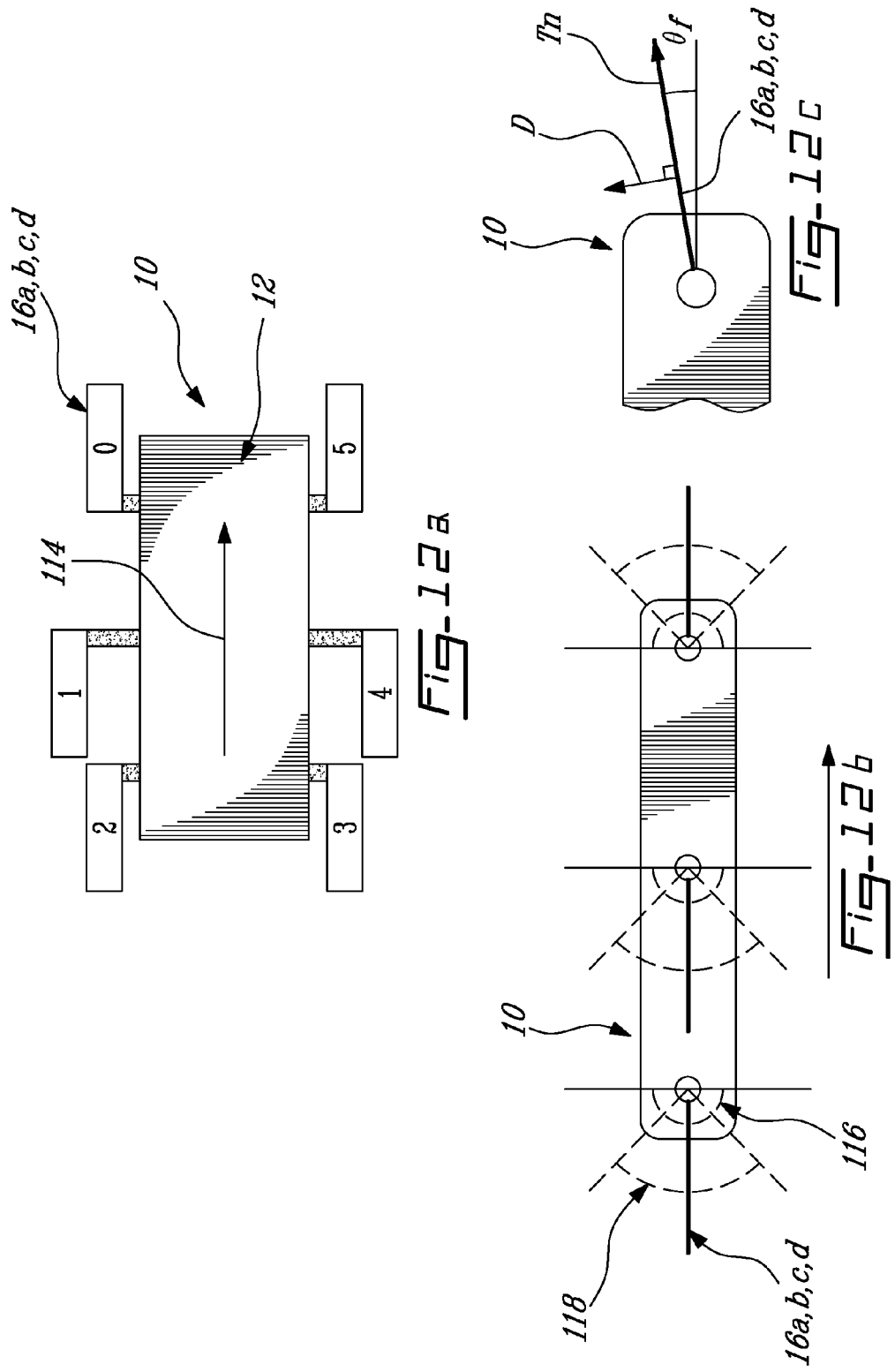

AMPHIBIOUS ROBOTIC DEVICE

FIELD OF THE INVENTION

The present invention relates to robotic devices, particularly to robotic devices designed to maneuver in a liquid medium as well as on a solid medium.

BACKGROUND ART

In general, underwater robotics poses certain unique challenges that render many of the principles of terrestrial robotics problematic. A robot underwater is able to move along six degrees of freedom, and maneuvering with six degrees of freedom creates serious complications. A computationally straightforward task of pose maintenance on land becomes far more challenging under water, because of environmental factors such as strong currents in marine environments. Infra-red sensors lose some of their effectiveness in water as well. Wireless radio communications are also impossible over a large distance in water compared to ground based control. All these issues make underwater robotics problems more difficult than terrestrial robotics.

The traditional approach used to propel undersea vehicles is by using propellers or thrusters. Although simple by design, these vehicles lack the maneuverability and agility seen in fish and other marine species. In addition, thrusters are not an energy efficient approach to station keeping underwater.

In computer vision, visual tracking is the process of repeatedly computing a position of a feature or sets of features in a sequence of input images. A number of methods for visual tracking in a dry environment (i.e. not underwater) based on the color of the target are known. One of the known approaches is color-blob tracking, where the trackers segment out sections of the image that match a threshold level for the given target and based on the segmentation output, tracks the shape, size or centroid of the blob, among other features. Another approach is the matching of color histograms, which are a measure of color distribution over an image. Some of the tracking methods are combined with statistical methods to provide more accurate results, one example being mean-shift tracking algorithms, which attempt to maximize the statistical correlation between two distributions. However, the tracking of objects in a dry environment is very different from the tracking of objects underwater. Underwater, vision is impaired by the turbidity of the water caused by floating sedimentation ("aquatic snow") and other floating debris. The behavior of the light beams is altered by many factors including refraction, which is influenced by waves and water salinity level, scattering, which causes a reduction of contrast between objects and influences color hues, and absorption, which is frequency dependent and makes detection of certain colors difficult. As such, vision in underwater environments has rarely been examined due to the complications involved.

SUMMARY OF INVENTION

It is therefore an aim of the present invention to provide an improved underwater robotic device.

It is also an aim of the present invention to provide an improved amphibious device which can be propelled both in a liquid medium and on a solid medium.

Therefore, in accordance with the present invention, there is provided Therefore, in accordance with the present invention, there is provided a control system for a robotic device maneuverable in at least a liquid medium, the control system comprising at least one visual sensor retrieving an image of an environment of the device in the liquid medium, an image analyzing module receiving the image, determining a presence of an object of a given type therein and analyzing at least one property of the object, a motion calculator determining a desired motion of the device based on the at least one property of the object, and a controller operating a propulsion system of the device to obtain the desired motion.

Also in accordance with the present invention, there is provided a robotic device for navigating in at least a liquid medium, the robotic device comprising a body, a legged propulsion system having a series of legs external of the body, each of the legs being driven by an actuator and mounted to the body for pivotal movement about a respective transverse axis, each of the legs being operable to at least oscillate relative to the body about the respective transverse axis such that interaction between the legs and the liquid medium produces propulsive forces that displace the robotic device within the liquid medium, and a control system including at least one sensor providing data about an environment of the device, the control system using data from the at least one sensor to determine a desired motion of the robotic device, determining a corresponding required leg motion of each of the legs to produce the desired motion and actuating the actuators such as to displace each of the legs in accordance with the corresponding required leg motion.

Also in accordance with the present invention, there is provided an amphibious robotic device comprising a body, a legged propulsion system having a series of legs external of the body, each of said legs being driven by an actuator and mounted to the body for pivotal movement about a respective transverse axis in one of at least a swimming mode and a walking mode, said legs being configured to oscillate relative to the transverse axis in said swimming mode when the device is in a liquid medium such that interaction between said legs and the liquid medium provides propulsive forces that displace the vehicle body within the liquid medium, said legs being configured to rotate relative to the transverse axis in said walking mode when the device is on a solid medium such that interaction between said legs and the solid medium provides propulsive forces that displace the vehicle body in a desired direction on the solid medium, and a control system having at least one sensor operable to detect with which of the liquid medium and the solid medium the robotic device is interacting and a leg controller synchronously operating said legs in either one of the swimming mode and the walking mode based on the detected medium.

Also in accordance with the present invention, there is provided a robotic device for navigating in at least a liquid medium, the robotic device comprising a body, a legged propulsion system having a series of legs external of the body, each of said legs being driven by an actuator and mounted to the body for pivotal movement about a respective transverse axis, each of the legs being operable to at least oscillate relative to the body about the respective transverse axis such that interaction between the legs and the liquid medium produces propulsive forces that displace the robotic device within the liquid medium, and a control system allowing the robotic device to perform a station keeping operation by computing a desired thrust at each leg along a yaw axis and a roll axis of the device, combining the desired thrust along the yaw and roll axes to determine a selected thrust angle and thrust magnitude, rotating each of the legs at a rate generating a pressure drag consistent with the desired thrust when a difference between the selected thrust angle and a current leg angle is greater than a given angle value, and increasing an oscillation amplitude of each of the legs up to the thrust magnitude when the difference between the selected thrust angle and the current leg angle is at most the given angle value.

Also in accordance with the present invention, there is provided a method of controlling an amphibious robotic device having a series of independently operable legs for propulsion thereof, the method comprising using a sensor disposed within the robotic device to detect at least one predetermined environmental reference, analyzing an output of said sensor to determine at least one property of the detected environmental reference, determining a desired motion of the robotic device based on the at least one property, calculating a required motion of each of said legs to obtain the desired motion of the robotic device, and controlling operation of said legs based on the respective required leg motion calculated.

Also in accordance with the present invention, there is provided a device for selectively navigating on a solid medium and in a liquid medium, the device comprising a body, a series of legs attached to the body to rotate about a respective rotational axis extending transversely to the body, each leg including at least one rigid frame extending in a plane substantially perpendicular to the respective rotational axis and a flexible member disposed substantially perpendicular to the at least one rigid frame, the device being propelled on the solid medium through a rotational motion of each leg about the respective rotational axis causing intermittent engagement of the at least one rigid frame with the solid medium, and the device being propelled in the liquid medium through an oscillatory motion of each leg about the respective rotational axis causing the flexible member to produce a propulsive force through interaction thereof with the liquid medium.

Also in accordance with the present invention, there is provided a robotic device for navigating in at least a liquid medium, the robotic device comprising a body, a propulsion system producing propulsive forces that displace the robotic device within the liquid medium, a control system including at least one visual sensor retrieving an image of an environment of the device in the liquid medium, the control system determining a presence of an object of a given type in the image, determining a desired motion of the device based on at least one property of the object, and operating the propulsion system of the device to produce the desired motion.

BRIEF DESCRIPTION OF THE DRAWINGS

Reference will now be made to the accompanying drawings, showing by way of illustration a particular embodiment of the present invention and in which:

FIG. 12A is a schematic top view of the device of FIG. 1 showing parameters used in a hovering gait thereof;

FIG. 12B is a schematic side view of the device of FIG. 1 illustrating stand-by range and a thrust range of the hovering gait; and FIG. 12C is a schematic, partial side view of the device of FIG. 1 illustrating the angle, thrust and pressure drag for one of the legs.

DETAILED DESCRIPTION OF PARTICULAR EMBODIMENTS

Figure 1:
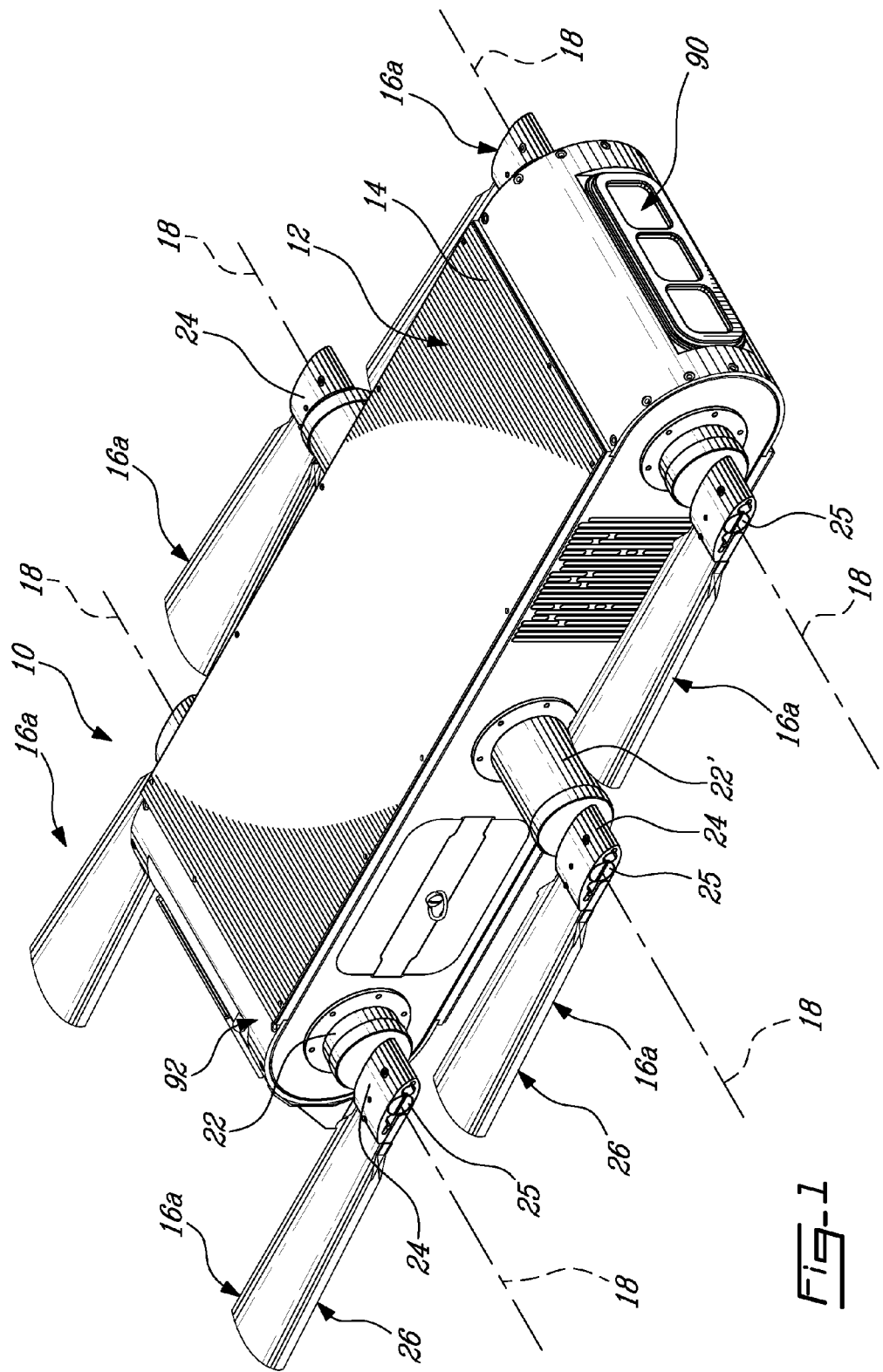
FIG. 1 is a perspective view of a robotic device in accordance with a particular embodiment of the present invention.
Figure 2:
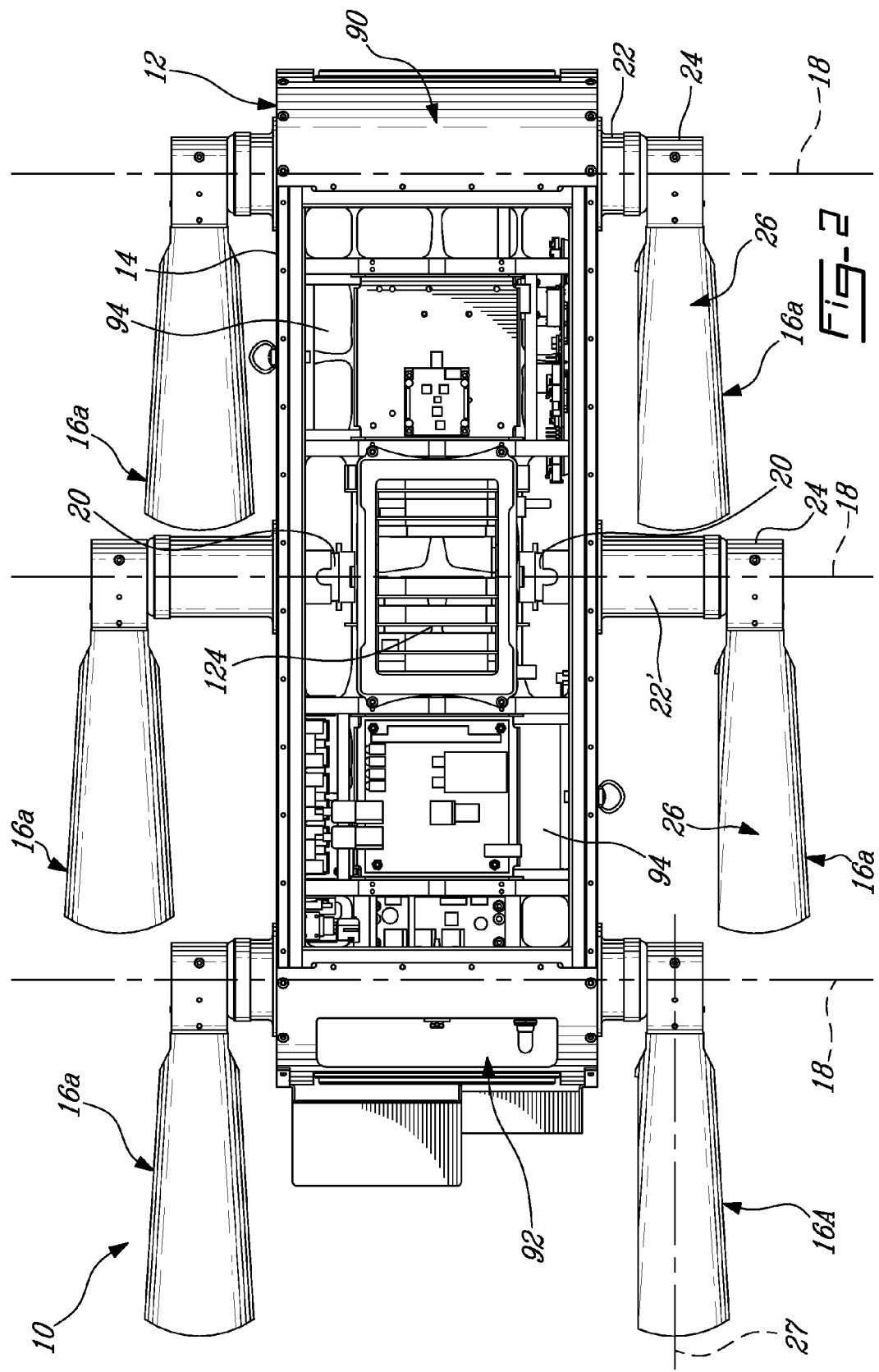
FIG. 2 is a top view of the device of FIG. 1, with a top panel thereof removed for improved clarity.

Referring to FIGS. 1-2, a robotic device in accordance with a particular embodiment of the present invention is generally shown at 10. The device 10 is designed as an aquatic swimming robot that is also capable of operating on a solid medium, including compact ground surfaces and sand. As such, the device 10 is said to be amphibious in that it can walk on a solid surface and penetrate a neighboring liquid medium, swim in that liquid medium and exit the liquid medium on an appropriate interface between the solid and liquid medium (e.g. a ramped up bottom surface of the liquid environment becoming the solid medium such as a beach).

The device 10 comprises a body 12 including a waterproof shell 14 which can be for example made of aluminum, inside which all electronics, sensors, power supplies, actuators, etc. are housed. The shell 14 includes buoyancy plates which allows for the buoyancy of the device 10 to be adjusted depending on the properties of the liquid medium the device 10 is going to be submerged in (e.g. salt water, fresh water). The buoyancy of the device 10 is preferably adjusted to near neutral.

The device 10 comprises six legs 16a which are attached to the body such as to be rotatable about a respective rotational axis 18 extending transversely with respect to the body 12. As such, the motion of each leg 16a is controlled by a single respective actuator 20 (see FIG. 2), thus minimizing the complexity of the motion of the device 10 as well as the required energy to actuate the legs 16a. Underwater, the legs 16a give the device the ability to turn sideways (yaw), dive (pitch) and rotate on its horizontal axis (roll), as well as the ability to move forward and backward (surge), and up and down (heave).

The device 10 comprises a front camera assembly 90 mounted in the front of the body 12 and a rear camera assembly 92 mounted in the rear of the body 12. The device also includes a power source, for example a series of batteries 94 (see FIG. 2). The device 10 can further comprise various internal sensors for monitoring the device functions, for example battery power and power consumption levels for the leg actuators 20.

Leg Design

In the embodiment of FIGS. 1-2, the legs 16a shown are mainly designed for water propulsion. Each actuator 20 is mounted rigidly to a cylindrical hip extension 22, 22' which is in turn rigidly mounted to the body 12. Each leg 16a includes a leg mount 24 which is rigidly mounted on an output shaft 25 (see FIG. 1) of the respective actuator 20 passing through the respective hip extension 22, 22', such that the leg mount 24 is rotated by the output shaft 25. Each leg 16a also includes a flipper 26 which extends from the leg mount 24 such that a longitudinal axis 27 (see FIG. 2) of the flipper 26 is perpendicular or substantially perpendicular to the rotational axis 18 of the respective leg 16a. The legs 16a produce thrust underwater through an oscillatory motion, i.e. a reciprocating pivotal motion of each flipper 26 about its respective rotational axis 18. In a particular embodiment, each flipper 26 includes two flexible sheets, for example made of vinyl, which are glued together over a series of rods. The flexible sheets provide the necessary flexibility to capture water when the legs 16a are oscillating, while the rods provide the necessary stiffness to generate thrust. The legs 16a are distributed symmetrically about the body 12, with three legs 16a being equally spaced apart on each side thereof. The middle hip extensions 22' are longer than the front and rear hip extensions 22, such that the middle legs 16a extend outwardly of the other legs 16a to avoid interference between adjacent flippers 26. In an alternate embodiment, the relative size of the body 12 and the flippers 26 is such that the hip extensions 22 have a similar length without interference between the legs 16a of a same side. While the legs 16a are particularly well suited for use underwater, they are less efficient for motion on a solid medium.

Figure 3:
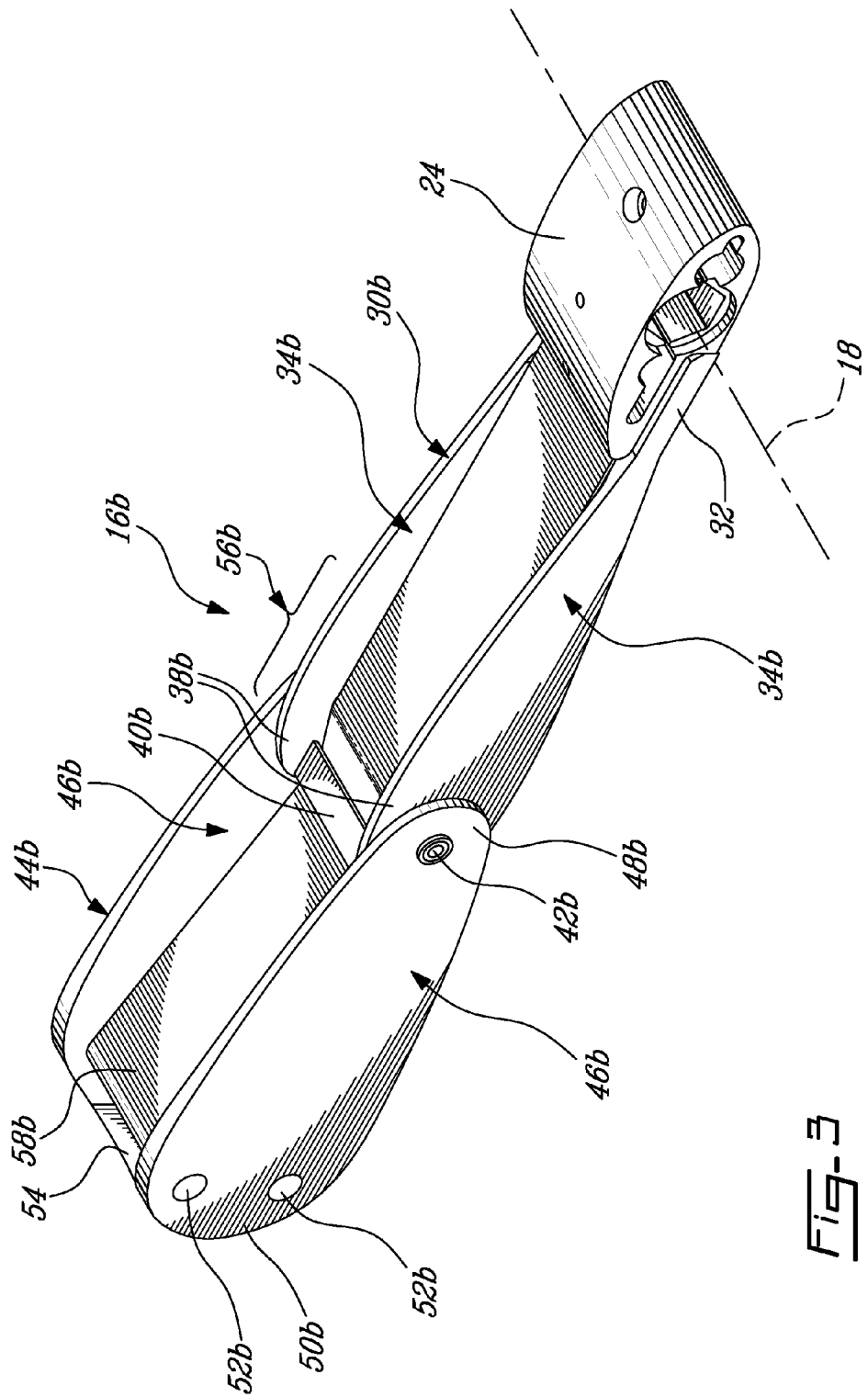
FIG. 3 is a perspective view of a leg of the device in accordance with an alternate embodiment of the present invention.
Figure 4:
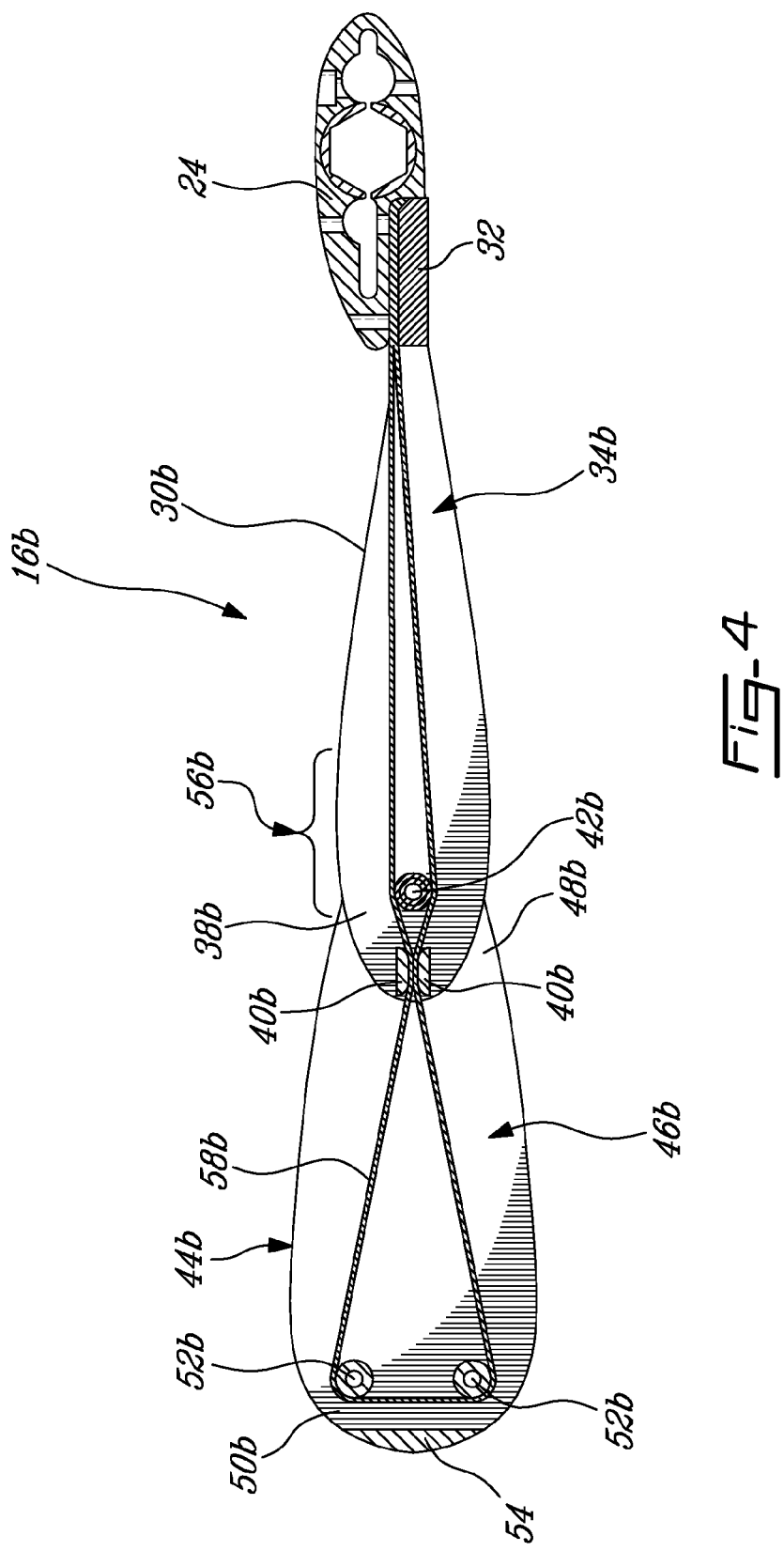
FIG. 4 is a cross-sectional view of the leg of FIG. 3.

Referring to FIGS. 3-4, an amphibious leg 16b according to a particular embodiment of the present invention is shown. This leg 16b allows for a good compromise between underwater propulsion and propulsion on a solid medium. By replacing the legs 18a of the device 10 with legs such as the leg 18b, good underwater propulsion is provided, although generally less efficient than with the legs 16a, and efficient propulsion on a solid medium is provided, both forward and backward. Each leg 16b includes a leg mount 24 similar to that of the previously described legs 16a, and which rigidly engages the respective actuator output shaft 25 (not shown in FIGS. 3-4) for rotation and/or oscillation about the respective axis 18. An upper member 30b of the leg 16b includes an attachment plate 32 rigidly attached to the leg mount 24, and spaced apart upper rigid plates 34b extending from the attachment plate 32 perpendicularly to the rotational axis 18 of the leg 16b. The upper plates 34b are teardrop-shaped, with their distal larger end 38b being interconnected by two spaced apart transverse plates 40b. A joint pin 42b also extends between the distal ends 38b of the upper plates 34b between the transverse plates 40b and the attachment plate 32.

A lower member 44b of the leg 16b includes lower spaced apart rigid plates 46b also extending perpendicularly to the rotational axis 18 of the leg 16b. The proximal ends 48b of the lower plates 46b extend outwardly of the distal ends 38b of the upper plates 34b and are also interconnected by the joint pin 42b. The joint pin 42b is rotationally connected to at least one of the upper and lower members 30b, 44b, such that the members 30b, 44b are pivotally interconnected by the joint pin 42b. The lower plates 46b are also teardrop-shaped, with their distal larger end 50b being interconnected by two spaced apart end pins 52b, and by a rounded end connecting member 54.

Each of the upper plates 34b forms with its associated lower plate 46b a substantially planar frame 56b mainly defined in a plane perpendicular to the rotational axis 18 of the leg 16b, and as such creating minimal interference with the water when the device 10 is submerged. The frames 56b are made of a rigid material which can be for example an adequate metal or composite material.

The leg 16b also includes an elastic member 58b which extends between the frames 56b perpendicularly thereto. Referring particularly to FIG. 4, the elastic member 58b is a double member which extends from the attachment plate 32 to around the end pins 52b, passing between the transverse plates 40b and on each side of the joint pin 42b. The elastic member 58b is a thrust producing member when the leg 16b is moved underwater. The spaced apart end pins 52b shape the elastic member 58b so that during swimming, the liquid medium is forced away from the end of the lower section 54, thus reducing the drag. The transverse plates 40b offset the bending point of the elastic member 58b from the joint pin 42b, such as to increase the amount by which the elastic member 58b stretches upon relative pivoting of the members 30b, 44b. The elastic member 58b thus provides compliance to the leg 16b, while limiting the relative pivoting motion of the upper and lower members 30b, 44b such that the frames 56b can bear the weight of the device 10 when the device 10 moves on solid ground. In a particular embodiment, the elastic member 58b is made of a material providing increased resistance to the pivoting motion of the members 30b, 44b about the joint pin 42b as the members 30b, 44b are pivoted away from the aligned position shown in the Figures.

The leg 16b therefore defines a jointed limb that is at least partially compliant when used on a solid medium and at least partially stiff when used in a liquid medium. The elastic member 58b acts similarly to a ligament which interconnects the two members 30b, 44b of the leg 16b and constrains the relative pivotal movement such as to arrive at a desired gait of the device, both on a solid medium and in a liquid medium (e.g. water).

Figure 5:
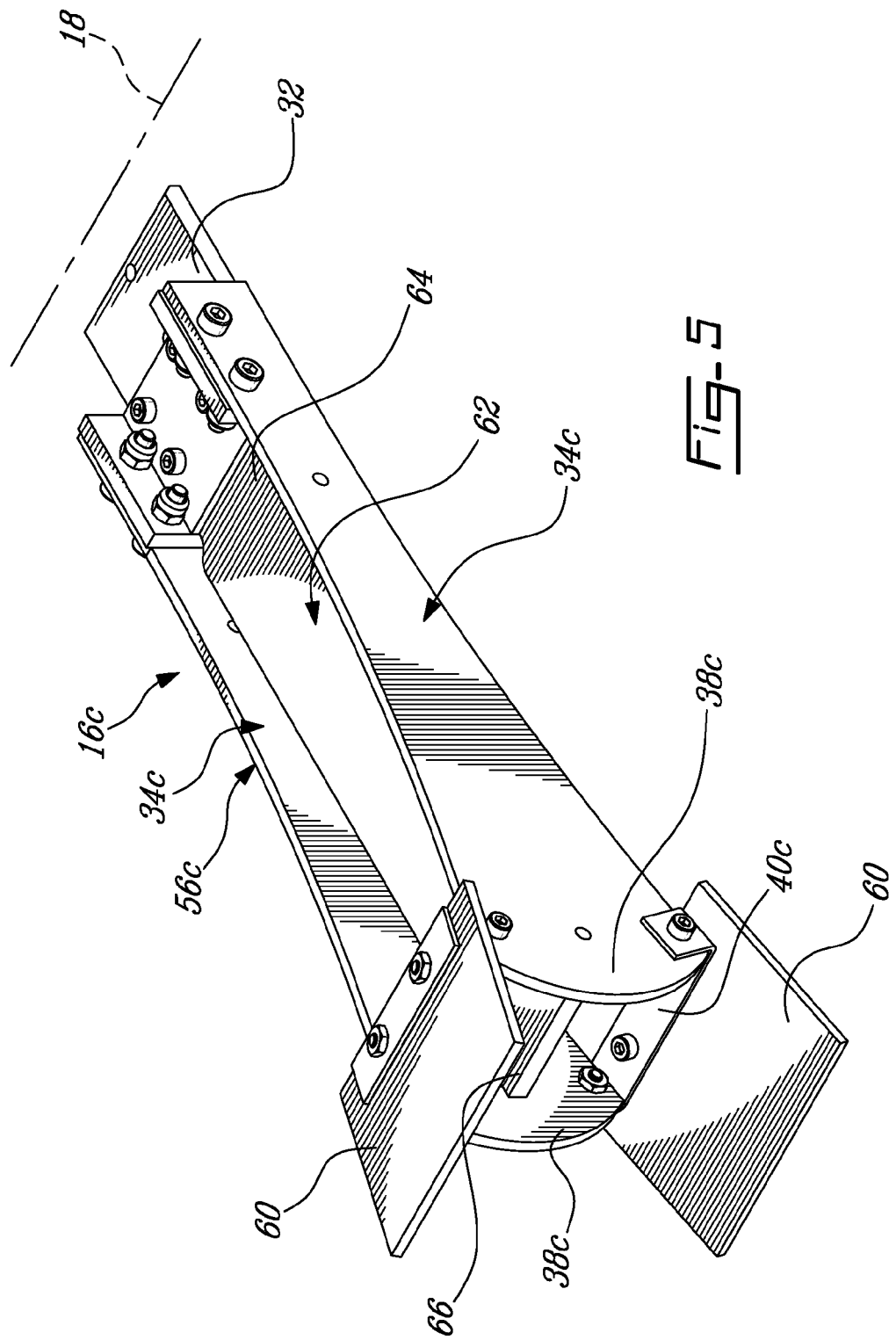
FIG. 5 is a perspective view of a leg of the device in accordance with another alternate embodiment of the present invention.
Figure 6:
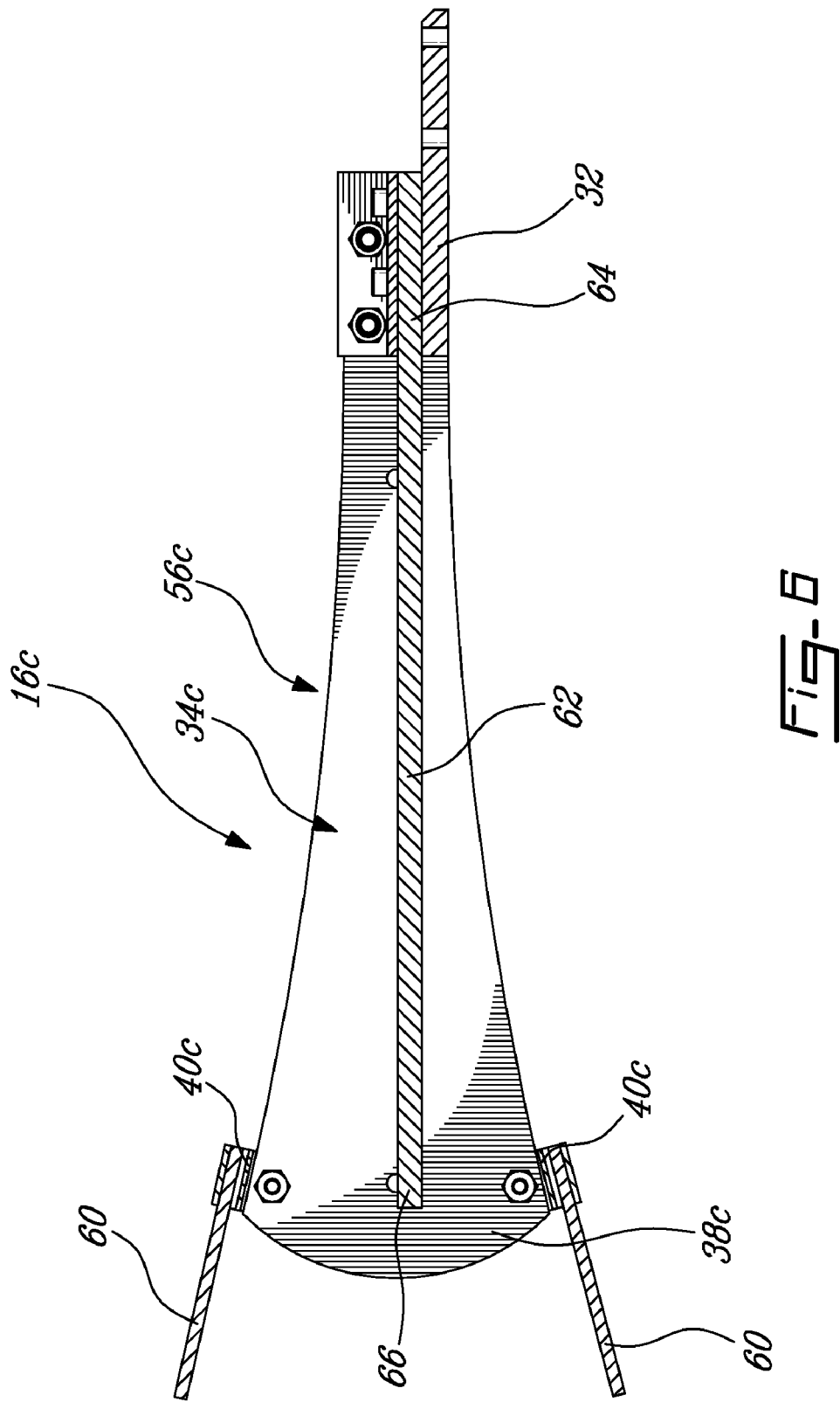
FIG. 6 is a cross-sectional view of the leg of FIG. 5.

Referring to FIGS. 5-6, an amphibious leg 16c according to an alternate embodiment of the present invention is shown. Each leg 16c includes a leg mount 24 (not shown in FIGS. 5-6) is similar to that of the previously described legs 16a,b and which rigidly engages the respective actuator output shaft 25 (not shown in FIGS. 5-6). An attachment plate 32 is rigidly attached to the leg mount 24, and spaced apart rigid plates 34c extend from the attachment plate 32 perpendicularly to the rotational axis 18 of the leg 16c. The plates 34c have rounded distal ends 38c interconnected at each extremity thereof by a transverse plate 40c. A flexible toe plate 60 is rigidly connected to each transverse plate 40c, the toe plate 60 flexing upon contact of the leg 16c with a solid surface to augment a contact area between the leg 16c and the solid surface, and springing back into an unflexed position when contact with the ground is lost. The plates 40c thus define spaced apart rigid frames 56c which, by being mainly defined in a plane perpendicular to the rotational axis 18 of the leg 16c, have a minimal interference with the water when the device 10 is submerged.

The leg 16c also includes a flexible flipper 62, the proximal end 64 thereof being rigidly connected to the attachment plate 32 and the distal end 66 thereof being free. The flipper 62 extends between the rigid frames 56c perpendicularly thereto. Because of its flexibility, the flipper 62 is free to flap between the rigid frames 56c. The flipper 62 is shorter than the rigid frames 56c such as to avoid contact with the ground in a dry environment. The flipper 62 and toe plates 60 are thrust producing members when the leg 16c is moved underwater. The rigid frames 56c provide a channeling effect underwater such that there is not spill over when the flipper 62 bends, thus increasing the thrust produced.

Figure 7:
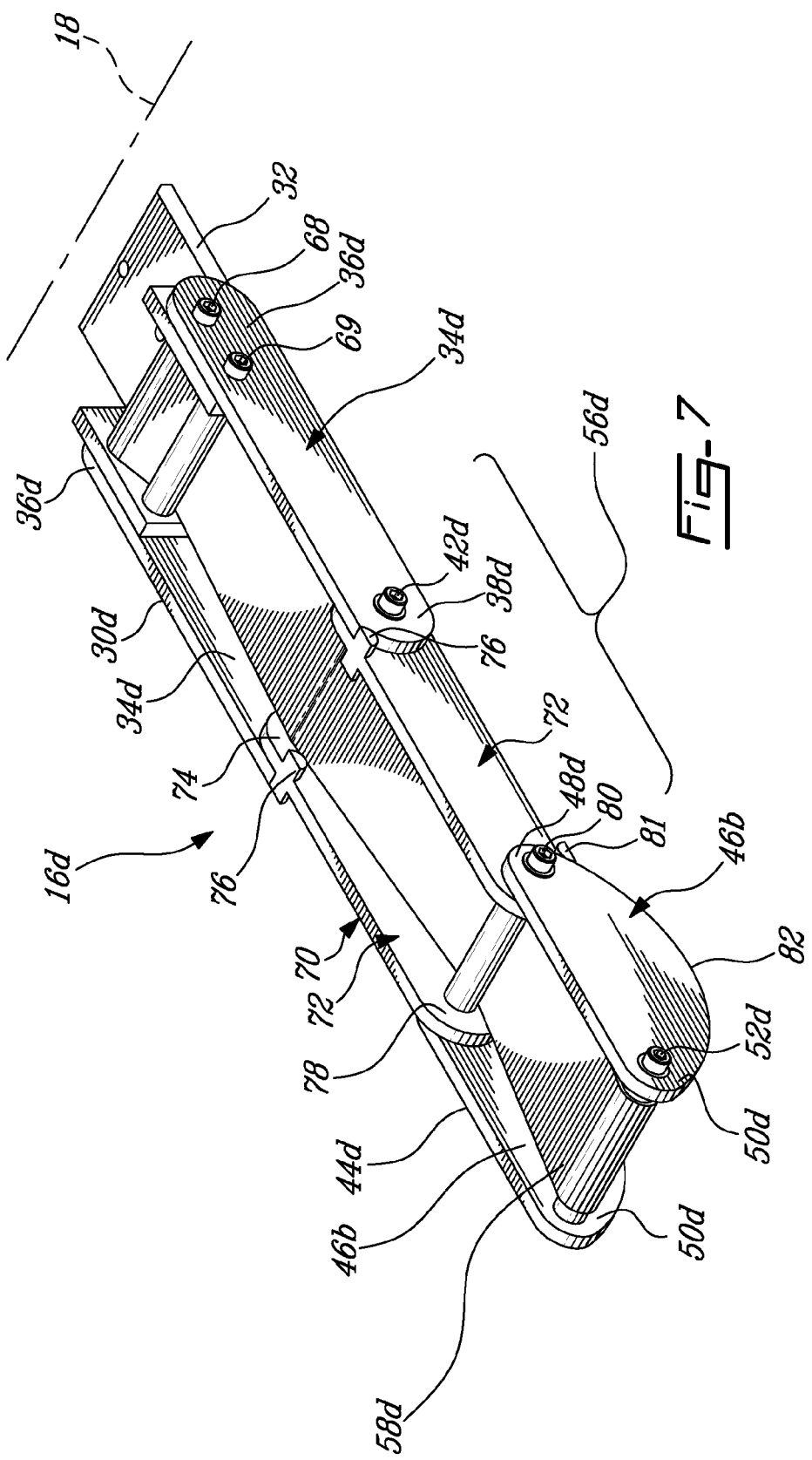
FIG. 7 is a perspective view of a leg of the device in accordance with a further alternate embodiment of the present invention.
Figure 8:
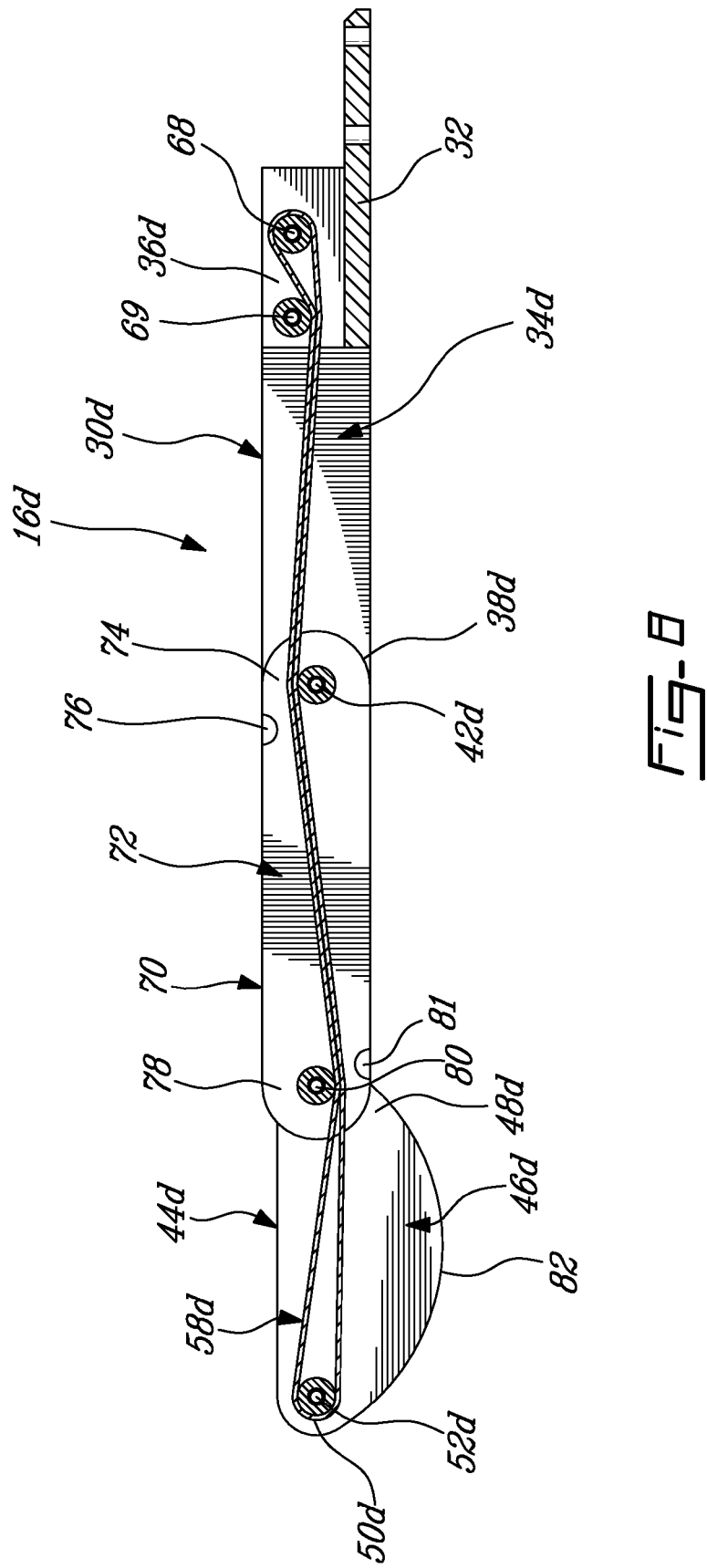
FIG. 8 is a cross-sectional view of the leg of FIG. 7.

Referring to FIGS. 7-8, an amphibious leg 16d according to a further alternate embodiment of the present invention is shown. This leg 16d has however limited efficiency in a backward movement on land because of its directionally limited pivoting motion, as will be described further below. Each leg 16d includes a leg mount 24 (not shown in FIGS. 7-8) which is similar to that of the previously described legs 16a, b,c, and which rigidly engages the respective actuator output shaft 25 (not shown in FIGS. 7-8). An upper member 30d includes an attachment plate 32 rigidly attached to the leg mount 24, and spaced apart upper rigid plates 34d extending from the attachment plate 32 perpendicularly to the rotational axis 18 of the leg 16d. In the embodiment shown, the upper plates are 34d oblong shaped, although any shape conducive to good fluid flow underwater while maintaining adequate strength and rigidity when loaded by the weight of the device 10 on land can be used. The proximal end 36d of the upper plates 34d is interconnected by first and second spaced apart end pins 68, 69. An upper joint pin 42d also extends between the distal ends 38d of the upper plates 34d.

A middle member 70 of the leg 16d includes middle spaced apart rigid plates 72 also extending perpendicularly to the rotational axis 18 of the leg 16d. In the embodiment shown, the middle plates 72 are also oblong shaped, although here again any shape conductive to good fluid flow underwater while maintaining adequate strength and rigidity when loaded by the weight of the device 10 on land can be used. The proximal ends 74 of the middle plates 72 extend inwardly of the upper plates 34d and are also interconnected by the upper joint pin 42d. The upper joint pin 42d is rotationally connected to at least one of the upper and middle members 30d, 70, such that the upper and middle members 30d, 70 are pivotally interconnected by the upper joint pin 42d. The proximal ends 74 of the middle plates 72 also include a stopper 76 which limits the pivoting motion between the upper and middle members 30d, 70 along a single direction from the aligned position shown in the Figures. The distal ends 78 of the middle plates 72 are interconnected by a lower joint pin 80.

A lower member 44d of the leg 16d includes lower spaced apart rigid plates 46d also extending perpendicularly to the rotational axis 18 of the leg 16d. The lower plates 46d are semi-circular, with a rounded edge 82 defining a contact area with the ground surface. The lower plates 46d, along a proximal end 48d of the rounded edge 82, extend outwardly of the middle plates 72 and are also interconnected by the lower joint pin 80. The lower joint pin 80 is rotationally connected to at least one of the middle and lower members 70, 44d, such that the middle and lower members 70, 44d are pivotally interconnected by the lower joint pin 80. The distal ends 78 of the middle plates 72 include a stopper 81 which limits the pivoting motion between the middle and lower members 70, 44d along a single direction from the aligned position shown in the Figures. The lower plates 46d, along a distal end 50d of the rounded edge 82, are interconnected by a third end pin 52d.

Each set of connected upper, middle and lower members 30d, 70, 44d thus defines a substantially planar frame 56d, the two apart frames 56d being mainly defined in a plane perpendicular to the rotational axis 18 of the leg 16d and as such having a minimal interference with the water when the device is submerged.

The leg 16d also includes an elastic member 58d which extends between the frames 56d perpendicularly thereto. The elastic member 58d is a double member which extends around the first end pin 68 and the third end pin 52d, passing in between in a zigzag pattern against the second end pin 69, against the upper joint pin 42d on a side thereof opposite that of the second end pin 69 and against the lower joint pin 80 on side thereof opposite that of the upper joint pin 42d. The elastic member 58d is a thrust producing member when the leg 16d is moved underwater. The elastic member 58d also provides compliance to the leg 16d while limiting the relative pivoting motion between the members 30d, 70, 44d about the joint pins 42d, 80, by forcing the leg 16d in the aligned position, shown in the Figures, against the stoppers 76, 81. As such, the frames 56d can bear the weight of the device 10 when the device 10 moves on solid ground. In a particular embodiment, the elastic member 58d is made of a material providing increased resistance to the pivoting motion of the members 30d, 70, 44d about the joint pins 42d, 80 as the members 30d, 70, 44d are pivoted away from the aligned position.

Control System

Figure 9:
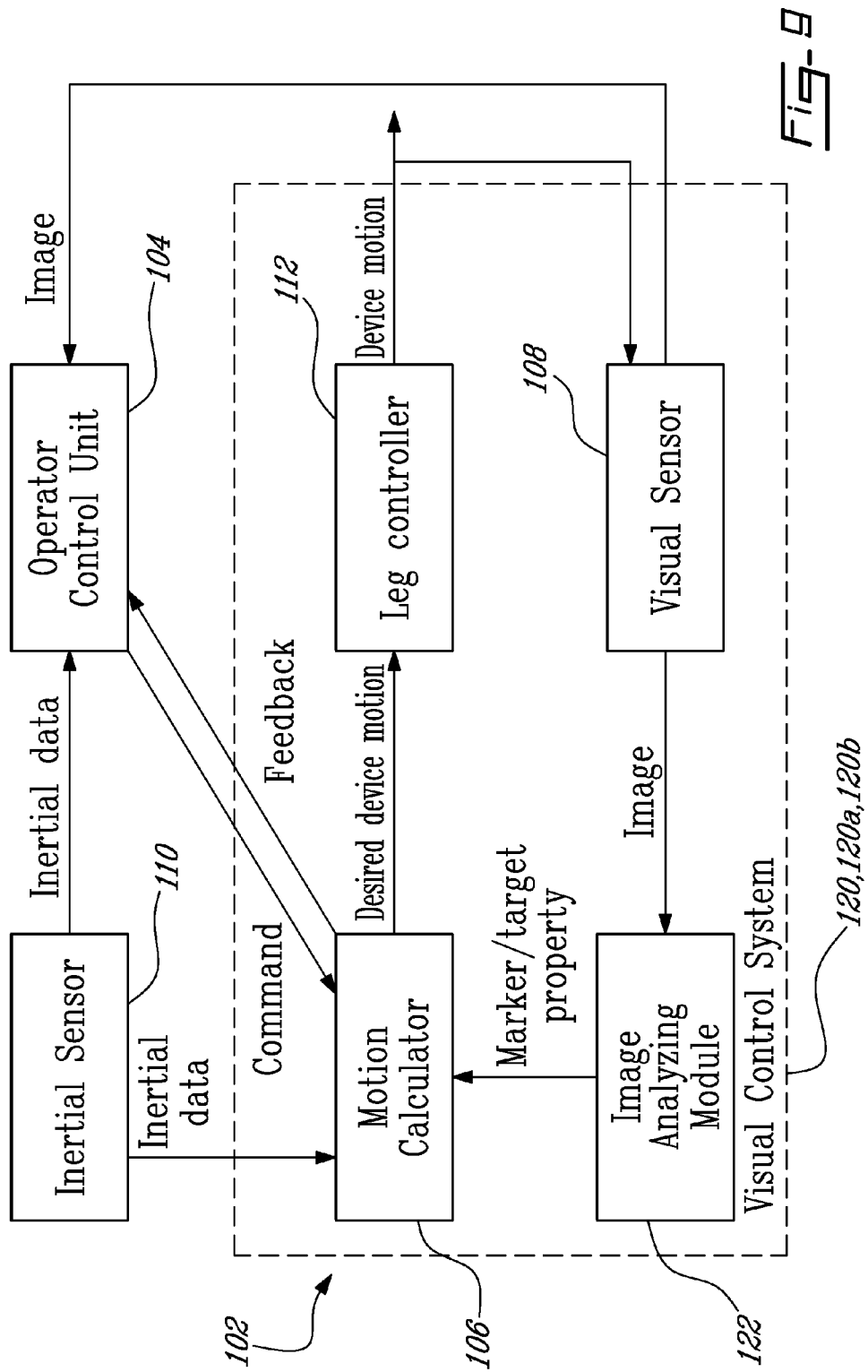
FIG. 9 is a block diagram of a control system for the device of FIG. 1.

Referring to FIG. 9, a control system 102 for the device 10 is shown. The system 102 optionally includes an operator control unit 104 allowing an operator to directly control the device 10, the operator control unit 104 sending signals to a motion calculator 106 in accordance with the operator input. The operator control unit 104 receives feedback from at least one visual sensor 108 of a visual control system 120, which in a particular embodiment includes a camera from one or both of the front and rear camera assemblies 90, 92, which provides streaming video from the device 10. The operator control unit 104 also receives feedback from an inertial sensor 110, or Inertial Measurement Unit (IMU), installed within the body 12 for orientation and acceleration sensing. The operator control unit 104 can also receive feedback from the motion calculator 106 containing any other relevant data to assist in controlling the device 10. Communication between the device 10 and the operator control unit 104 is optionally done over a fiber optic tether (not shown).

As described further below, the visual control system 120 also controls the device 10, and as such the operator control unit 104 can be omitted or used in conjunction with the visual control system 120.

The motion calculator 106 computes a desired motion of the device 10, i.e. pitch, roll, yaw, heave and/or surge, based for example on the signal from the operator control unit 104, and communicates this desired motion to a leg controller 112.

The leg controller 112 computes a required thrust at each leg 16a,b,c,d to obtain the desired motion, and determines the corresponding motion for each leg 16a,b,c,d. The leg controller 112 moves the legs 16a,b,c,d in accordance with a series of preset gaits programmed therein. Gaits are a combination of leg parameters that generate a fixed motion for a fixed set of parameters. Depending on whether the device 10 is swimming or walking, different table-driven gaits are used to drive the device 10. Walking gaits move the device 10 through complete rotation of the legs 16a,b,c,d. Swimming gaits move the device through a "kicking" motion of the legs 16a,b,c,d, i.e. an oscillatory motion of the legs 16a,b,c,d with various phase and amplitude offsets. In both cases, the leg controller 112 computes a series of three parameters for each leg 16a,b,c,d based on the required leg thrust: amplitude, offset and phase. The leg controller 112 actuates the actuator 20 of each leg 16a,b,c,d based on the three parameters calculated. The amplitude parameter governs the distance the legs 16a,b,c,d sweep along the spherical arch defined around the rotational axis 18 during each cycle. Offset dictates the starting orientation of the legs 16a,b,c,d relative to each other at the beginning of the cycle. Direction of the leg motion is controlled by the phase parameters of each leg 16a,b,c,d.

However, the swimming gaits only allow the device 10 to turn if it is moving forward or backward. As such, the leg controller 112 also includes hovering gaits to allow the device 10 to move along 5 degrees of freedom, i.e. pitch, roll, yaw, heave and/or surge without forward or rearward movement, such as to be able to hold a fixed position despite water currents, and to turn at that fixed location, for example to keep an object within camera range.

The motion calculator 106 also receives inertial data from the inertial sensor 110 which can influence the required motion communicated to the leg controller 112. In a particular embodiment, the motion calculator 106 uses the inertial data to determine if the device 10 is in a dry or underwater environment, and directs the leg controller 112 to use either the walking or the swimming/hovering gaits accordingly. As such the device 10 can autonomously switch to the appropriate gaits upon entering or coming out of the water.

Hovering Gaits

The hovering gaits of the leg controller 112, which allow the device 10 to perform station keeping, are described below. The leg controller 112 receives the required motion input from the motion calculator 106 including pitch ($C_p$), roll ($C_r$), yaw ($C_y$), heave ($C_h$) and surge ($C_s$). The leg controller first computes $F_x$ and $F_z$, the column vectors representing the desired thrust at each leg location in the x and z directions (see FIG. 12A, where arrow 114 indicates the forward direction). The legs 16a,b,c,d cannot generate thrust in the y direction. Accordingly, the desired thrust $F_x$ and $F_z$ for each leg 16a,b,c,d is computed by the leg controller 112 according to the following:

$$F_x = \begin{pmatrix} 0 & 0 & -k_y & 0 & k_s \\ 0 & 0 & -k_y & 0 & k_s \\ 0 & 0 & -k_y & 0 & k_s \\ 0 & 0 & k_y & 0 & k_s \\ 0 & 0 & k_y & 0 & k_s \\ 0 & 0 & k_y & 0 & k_s \end{pmatrix} \times C \quad F_x = \begin{pmatrix} k_p & k_r & 0 & k_h & 0 \\ 0 & k_r & 0 & k_h & 0 \\ -k_p & k_r & 0 & k_h & 0 \\ -k_p & -k_r & 0 & k_h & 0 \\ 0 & -k_r & 0 & k_h & 0 \\ k_p & -k_r & 0 & k_h & 0 \end{pmatrix} \times C$$

where $C=[C_p C_r C_y C_h C_s]^t$ and the constants $k_p$, $k_r$, $k_y$, $k_h$ and $k_s$ are used to scale down the input so that the absolute maximum value of the output is less than or equal to 1. The size of the column vectors $F_x$ and $F_z$ is equal to the number of legs 16a,b,c,d on the device 10, which in this case is six (6). The legs 16a,b,c,d are shown in FIG. 12A as identified by a number n ranging from 0 to 5, the legs 0 and 5 facing forward to provide an extended moment arm and symmetric pitching moment with the legs 2 and 3, as well as to provide quick reverse surge.

The selected thrust angle $\theta_{c,n}$ and magnitude $T_{c,n}$ for each leg n is thus computed by the leg controller 112 as:

$$\theta_{c,n} = \arctan\left(\frac{F_{zn}}{F_{xn}}\right) \text{ and } T_{c,n} = \sqrt{F_{xn}^2 + F_{zn}^2}$$

The most efficient way to generate thrust in a direction $\theta_r$ is through rapid oscillation (period of 250-500 ms) of the leg 16a,b,c,d around that angle $\theta_r$. The magnitude of the thrust is approximately proportional to the amplitude of the oscillation. The leg angle $\theta_f$ over time is thus:

$$\theta_f(t) = T_n \sin(\omega_f t + \phi_f) + \theta_r$$

where $\omega_f$ is the fixed frequency of oscillation and a phase shift $\phi_f$ is used between the legs. The leg angle $\theta_f$ and thrust $T_n$ are shown in FIG. 12C for one of the legs 16a,b,c,d.

To minimize delay in the execution of commands and parasitic forces generated upon orientation of the legs 16a,b,c,d, the leg controller 112 limits the range of thrust angle for each leg to a region 116 (see FIG. 12B) of 180°. This reduces the average reorientation angle responsible for the parasitic forces at the cost of reduced maximum device thrust. For example, the front legs are not used when a forward thrust is commanded, thereby reducing the maximum possible forward thrust of the device 10. To further improve the reaction time of the device 10, the leg controller 112 uses the pressure drag forces D (see FIG. 12C) generated when the legs 16a,b,c,d are reoriented. When the difference between the desired thrust angle and the current leg angle is greater than 45°, the leg 16a,b,c,d is rotated at a rate that generates a pressure drag D consistent with the desired thrust $T_c$ via a constant $K_{PD}$. As the leg surface passes the 45° region, the oscillation amplitude is increased until it reaches its selected amplitude as given by the equation for $\theta_f(t)$ set out above. Using discrete time equations and letting $\theta_r$ be the ramped value of the computed thrust angle $\theta_c$ and magnitude $T_c$, the motion for each leg 16a,b,c,d is set by the leg controller 112 in accordance with the two following equations:

$$\theta_r[t+1] = \theta_r[t] \quad \text{if } \theta_c[t] \text{ outside of thrust range}$$
$$\text{ramp}(K_{PD}T_c, \theta_r[t], \theta_c[t]) \quad \text{otherwise}$$

$$\theta_f[t+1] = \theta_r[r] \quad \text{if } |\theta_c[t] - \theta_f[t]| > 45°$$
$$T_c \frac{|\theta_r[t] - \theta_f[t]|}{45°} \sin(\omega_f t + \phi_f) + \theta_r[t] \quad \text{otherwise}$$

where the ramp(rate,a,b) function ramps value b toward a at a constant rate.

Also, in order to improve slow-changing commands, when the demanded thrust $T_c$ reaches zero, the leg controller 112 gradually moves the legs 16a,b,c,d back to a stand-by range 118 (see FIG. 12B) of 90°, such that the legs 16a,b,c,d are always able to generate the proper thrust rapidly by making the leg surface or its normal no more than 45° away from any desired thrust within the thrust range.

The hovering gaits thus allow the device 10 to maintain position based on operator commands through the operator control unit 104, the visual control system 120 (described further below) and/or input from the inertial sensor 110.

Visual Control Systems

Referring back to FIG. 9, the device 10 also includes the visual control system 120, 120a, 120b allowing the device 10 to be controlled based on visual input, i.e. autonomously from input from the operator control unit 104. The visual control system 120, 120a, 120b includes the motion calculator 106, leg controller 112 and visual sensor 108 described above, as well as an image analyzing module 122 receiving data from the visual sensor 108. In a particular embodiment, the visual sensor 108 includes a digital camera which is part of the front camera assembly 90 and which interfaces with the image analyzing module 122. The image analyzing module 122 detects the presence of a target of a selected type, and sends data on at least one property of that target to the motion calculator 106, as will be described in more detail below. As described above, the motion calculator 106 computes the required device motion and communicated it to the leg controller 112 which controls the leg actuators 20 in accordance with the appropriate gaits.

The target to be recognized by the visual control system 120, 120a, 120b can be designed to be highly robust and easy to read by both person and the device 10, and can be for example arranged in the form on a booklet and/or on the faces of a geometric object (such as for example a cube) to be easy to manipulate and transport.

Referring back to FIG. 2, in a particular embodiment, the device 10 includes two computers 124, one for the leg controller 112, and the other for the motion calculator 106 and image analyzing module 122. Both computers 124 are of the PC/104/Plus form factor, due to the space restrictions inside the body 12. These two computers 124, along with additional port and interface circuit boards stacked on top of each other, connect via ISA and PCI buses.

The visual control system 120, 120a, 120b can be used with a robotic device having a propulsion system other than legs, such as for example thrusters, the leg controller 112 being replaced by an equivalent controller determining the required thrust of the propulsion system and actuating it accordingly.

Tracker-Based Visual Control System

Figure 10:
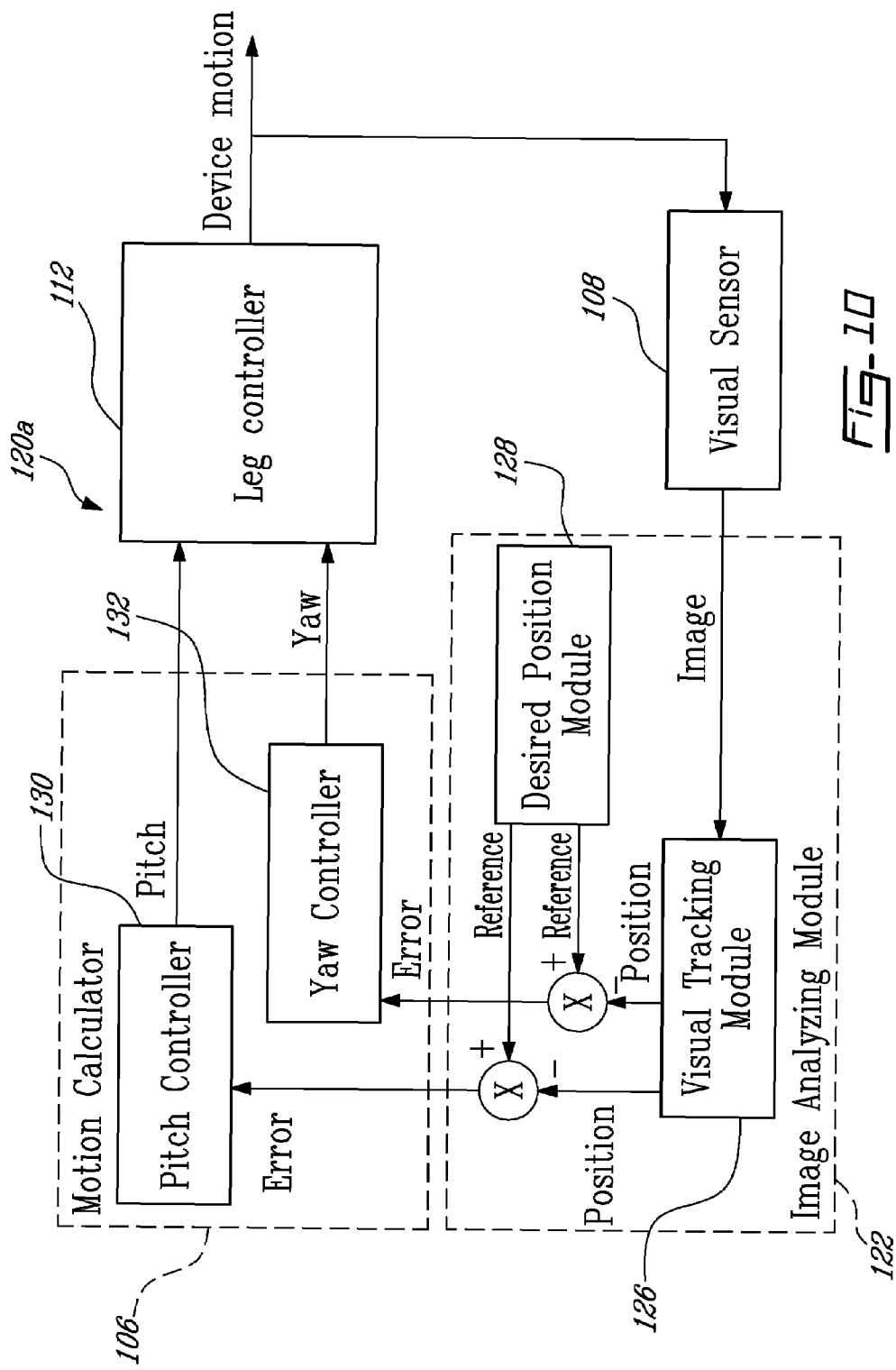
FIG. 10 is a block diagram of a particular embodiment of the control system of FIG. 9.

FIG. 10 illustrates a particular embodiment of the visual control system 120a. The image analyzing module 122 includes a visual tracking module 126, which receives an image from the visual sensor 108, determines the position of a given target and calculates an error in the target's position through comparison with a desired position signal from a desired position module 128, the desired position usually corresponding to the center of the image. The visual tracking module 126 preferably uses at least one of a color blob tracker algorithm, a histogram tracker algorithm and a mean-shift tracker algorithm, which are described below.

The color blob tracker is initialized with the target's color properties in the normalized RGB space, which is in effect an over-represented hue space, where the effect of lighting changes common underwater are minimum. This makes the tracking more effective in the underwater environment. The tracker scans the image converted in normalized RGB format, pixel-by-pixel, and the pixels falling within a given threshold of the color values of the target are turned on in the output image while the other pixels are turned off. To remove high-frequency (or shot/salt-and-pepper) noise, the median filtering algorithm is used over the segmented image with either 5-by-5 or 7-by-7 pixel grids, with typical threshold values of 30%-40%. The tracking algorithm detects the blob in the binary image in every frame, and calculates its centroid, which is taken as the new target location. The total mass of the blob is used as a confidence factor. The error signal is computed using the Euclidean distance in the image between the centroid of the blob and the center of the image frame. Two error signals are used for pitch and yaw, and both these signals are sent to the motion controller. A yellow target was found to work well with this type of tracker.

The histogram tracker compares rectangular regions of the input frame with the target region by comparing their corresponding color histograms. A histogram of the target to be tracked is created and stored. Every image from the camera is divided into rectangular regions and their normalized histograms having a fixed number of bins over the hue space are calculated. Computationally, the color histogram is formed by discretizing the colors within an image and counting the number of pixels of each color. Depending on the target and the size of the image frame, different number of bins can be used, with preferred numbers being 32 or 64, and with the regions having either one-eighth or one-sixteenth the dimension of the image frame. The use of normalized histograms reduces the effect on color matching of brightness changes in the underwater environment. The histograms are one-dimensional vectors that combine the multi-hue channel data. Similarity between histograms are computed by known measures, for example the histogram intersection measure, the $\chi^2$ (Chi-squared) measure, the Bhattacharyya distance measure, or Jeffrey's Divergence. Since the histograms are normalized, the measures return values ranging from 0 to 1; higher values indicating higher degree of similarity. The minimum similarity measure is preferably taken as 0.5; any measure below this threshold is not accepted as a valid target region. The center of the chosen window is taken as the new target location. As in the case of the color blob tracker, two error signals are used for pitch and yaw, and both these signals are sent to the motion controller. This type of tracker is suitable for tracking objects that have a variety of color.

For the mean-shift tracker, color histograms are also used as the underlying distribution. The histograms are three-dimensional arrays in this case, one each for the three RGB channels, with preferably 16 bins per channel. The target histogram are computed in a square window of sides preferably equaling 100 pixels. The color model probability density function for the target is calculated by overlaying the sub window by a kernel having the Epanechnikov profile. The weights for the mean-shift vector are calculated using the Epanechnikov kernel. The tracker is initialized with the last known location of the target and the target PDF model. In each successive tracking step, the candidate window having the same size as the target is created at the location of the last known target position, the candidate PDF model is calculated and the weights for pixel are calculated, leading to a new candidate position. The mean-shift process preferably uses 10 iteration steps to choose a new target location. The Bhattacharyya distance between the candidate PDF model and the target PDF model is calculated to quantify the similarity between the target and the new candidate location. The location with the minimum Bhattacharyya distance is chosen as the new target location. As for the other trackers, two error signals (pitch and yaw) are sent to the motion controller. The mean shift tracker is resistant to changes in lighting and appearance of duplicate objects in the frame, but necessitates substantially more computation than the preceding trackers.

In all cases, the visual tracking module 126 is able to track the target at almost 15 frames/second, and therefore without filtering, the commands sent to the leg actuators 20 by the leg controller 112 would be changing at such a high rate that it would yield a highly unstable swimming behavior. As such the motion calculator 106 which receives the error signals from the visual tracking module 126 includes a pitch controller 130 and a yaw controller 132 which are both PED controllers, used to take these target locations and produce pitch and yaw commands at a rate to ensure stable behavior of the device 10. The roll axis is not affected by this particular type of visual control. Given the input from the visual tracking module 126 at any instant, and the previous tracker inputs, each of the pitch and yaw controllers 130, 132 generates commands based on the following control law:

$$\Delta = K_P \overline{\epsilon_t} + K_I \int \overline{\epsilon_t} dt + K_D \frac{\partial}{\partial t} \overline{\epsilon_t}$$

where $\overline{\epsilon_t}$ is the time-averaged error signal at time t and is defined recursively as:

$$\overline{\epsilon_t} = \epsilon_t + \gamma \overline{\epsilon_{t-1}}$$

$\epsilon_t$ is the error signal at time t, $K_P$, $K_I$ and $K_D$ are respectively the proportional, integral and differential gains and $\gamma$ is the error propagation constant.

The pitch and yaw controllers 130, 132 work identically as follows. Each controller 130, 132 includes a low-pass first-order infinite-impulse response or IIR filter (i.e. a digital filter blocking high frequency signals), smoothing out fast changing pitch and yaw commands by averaging them over a period of time. A time constant is defined for the low-pass filter for each controller 130, 132. The gains $K_P$, $K_I$ and $K_D$ for each controller 130, 132 are input manually, with limits to truncate the gains. Each controller 130, 132 has a dead band limit applied to the error signal, i.e. a range of change in output for which the controller 130, 132 will not respond at all. This prevents the controller output from changing too frequently, by ignoring small changes in the error signal. A sleep time between each iteration in servoing is also introduced to reduce command overhead of the controllers 130, 132.

In a particular embodiment, the parameters for the controllers 130, 132 are as follows: a $K_P$ of 1.0 with corresponding limit of 1.0, a $K_I$ of 0.0 with corresponding limit of 0.3, and a $K_D$ of 0.0 with corresponding limit of 1.0 for both controllers 130, 132, a dead band of 0.2 for both controllers 130, 132, a time constant of 0.35 for the pitch controller 130 and 0.05 for the yaw controller 132, and a command limit of 1.0 for both controllers 130, 132.

The pitch and yaw controllers 130, 132 thus send required pitch and yaw of the device 10 to the leg controller 112, which as mentioned above computes a required thrust at each leg 16a,b,c,d, determines a corresponding leg motion following the appropriate gaits, and controls the actuator 20 of each leg 16a,b,c,d accordingly to obtain the required pitch and yaw.

In an alternate embodiment not shown, the visual tracking module 126 also compares the size of the target with a reference size, and sends a size error signal to the motion calculator 106, which computes a desired speed change for the device 10, sending corresponding motion data to the leg controller 112. As such the device 10 can remain within a given distance of the target by modifying its speed.

The visual control system 120a thus allows the device to follow a moving target or, through use of the hovering gait, hold position relative to a stationary target.

Marker-Based Visual Control System

Figure 11:
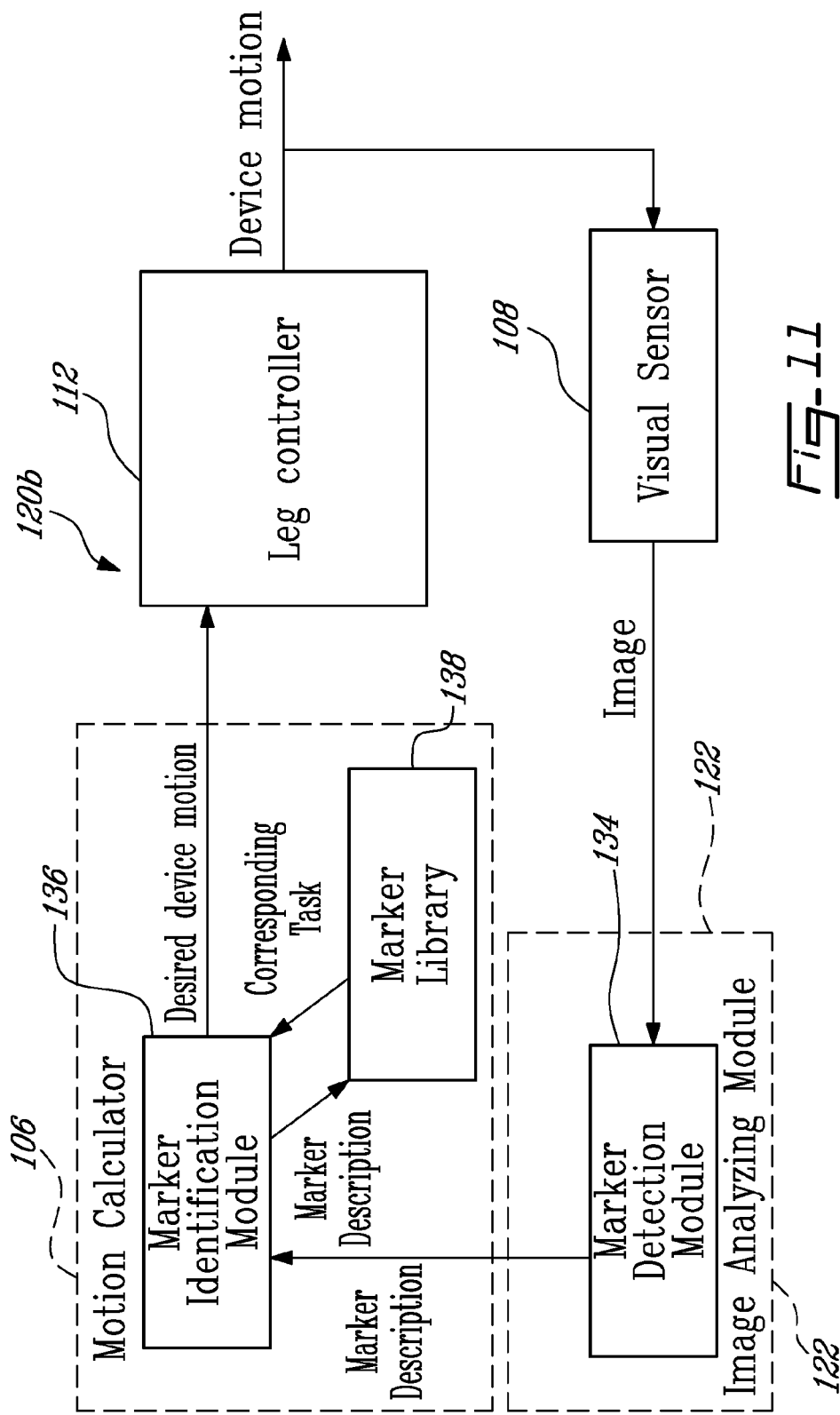
FIG. 11 is a block diagram of another particular embodiment of the control system of FIG. 9.

FIG. 11 illustrates another embodiment of the visual control system 120b. The image analyzing module 122 includes a marker detection module 134, which is configured to detect a target of a particular type, for example an ARTag marker. ARTag markers include both symbolic and geometric content, and are constructed using an error-correcting code to enhance robustness. The marker detection module 134 sends the description of the marker, which in the case of an ARTag marker is a binary number corresponding to the black and white regions of the marker, to a marker identification module 136 which is part of the motion calculator 106. The motion calculator 106 also includes a marker library 138, which contains a list of the possible markers, each being associated with a particular command, for example turn right, change speed to 1 m/s, go to location X, film during a given period, switch to the hovering, swimming or walking gaits, etc. The marker identification module 136 thus accesses the marker library 138 to identify the marker and retrieve the associated command. If the command is one of motion of the device 10, the marker identification module 136 sends the required motion signal (pitch, yaw, roll, heave and/or surge) to the leg controller 112, which as mentioned above computes a required thrust at each leg 16a,b,c,d, determines the motion of each leg 16a,b,c,d based on the appropriate gaits and controls the actuator 20 of each leg 16a,b,c,d accordingly to produce the required motion. In this embodiment a diver can thus communicate directly with the device 10 and give it a series of instructions simply by showing it different cards having the adequate markers illustrated thereon. The motion calculator 106 can also memorize a series of commands such that the diver can in fact program in advance a series of motions or tasks for the device 10.

The visual control systems 120a,b of FIG. 10 and FIG. 11 can be used together, such that for example the device 10 follows a given target unless a marker is detected, at which point the device 10 stops following the target and obeys the commands dictated by the marker. As mentioned above, the visual control system 120, 120a, 120b can be used with a robotic device moved by a propulsion system other than legs, the leg controller 112 being replaced by an equivalent controller receiving the desired device motion signal, determining the corresponding required thrust of the propulsion system and actuating the propulsion system accordingly.

The use of visual sensing to control the device 10 makes use of a passive sensing medium which is thus both non-intrusive as well as energy efficient. These are both important considerations (in contrast to sonar for example) in a range of applications ranging from environmental assays to security surveillance. Alternative sensing media such as sonar also suffer from several deficiencies which make them difficult to use for tracking moving targets at close range in potentially turbulent water.

The visual control abilities of the device 10 allows it to follow a moving object, for instance a diver, and/or accept commands from the diver on presentation of cards carrying predetermined markers corresponding with tasks to be performed. A complete sequence of actions can be programmed into the device 10 using the predetermined markers. As such a diver can communicate directly with the device 10 without the assistance of an operator located on the surface and as such with or without a tether.

The device 10 can thus be operated in a semi-autonomous manner, with or without input from an operator on the surface through the operator control unit 104.

The device 10 of the present invention can be used in a wide range of applications. These include underwater search and rescue, coral health monitoring, monitoring of underwater establishments (e.g. oil pipelines, communication cables) and many more. Specifically, environmental assessment tasks in which visual measurements of a marine ecosystem must be taken on a regular basis can be performed by the device 10.

The device 10 can also be used in a variety of diver-assisting tasks, such as monitoring divers from a surface, providing lighting (for example while following a diver), providing communication between divers and the surface, carrying cargo and/or tools, carrying audio equipment or air reserves, etc.

In a particular embodiment, the device 10 includes an acoustic transducer and as such allows the diver to hear sounds transmitted from the surface, stored on the device 10 and/or synthesized by the device 10, as well as to send acoustic signals back to the surface by having them relayed by the device 10, while following the diver or another target and/or responding to commands given by the diver through the use of visual markers. The sounds could be, for example, music, instructional narrative and/or cautionary information. The sounds emitted by the device 10 can depend on various factors that can be sensed by the device 10, for example, on the depth or location of the device 10, the length of time the diver has been underwater, the water temperature, or other environmental parameters.

The visual tracking module 126 can be used to recognize given landmarks and as such allow the device 10 to return autonomously to its starting point once a given task is performed. The amphibious legs 16*b,c,d* allow the device to start from and return to a location on dry land while performing a task (such as video surveillance) underwater.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A control system for a robotic device maneuverable in at least a liquid medium, the control system comprising:
    at least one visual sensor retrieving an image of an environment of the device in the liquid medium;
    an image analyzing module receiving the image, determining a presence of an object of a given type therein and analyzing at least one property of the object;
    a motion calculator determining a desired motion of the device based on the at least one property of the object, the motion calculator including an angular controller which calculates a required angular displacement necessary to achieve said desired motion of the device, wherein the angular controller includes at least a yaw controller calculating a required yaw of the device and a pitch controller calculating a required pitch of the device, the desired motion including the required yaw and the required pitch; and
    a controller operating a propulsion system of the device to obtain the desired motion.

2. The control system according to claim 1, wherein the propulsion system of the device include a series of legs each movable in at least an oscillatory motion to produce a propulsive force in the liquid medium, the controller calculating a respective required leg motion of each of the legs to obtain the desired motion of the device and operating each of the legs based on the respective required leg motion calculated.

3. The control system according to claim 1, wherein the desired motion of the device includes one of movement in at least one at six degrees of freedom and station keeping.

4. The control system according to claim 1, wherein, the motion calculator is programmed upon reception of the at least one property to memorize a series of at least two consecutive stops, each step including one of movement in at least one of six degrees of freedom and station keeping, the desired motion successively corresponding to each of the consecutive step.

5. The control system according to claim 1, wherein the image analyzing module determines an identify of the object from a given list of possible objects of the given type, the motion calculator determining the desired motion of the device from the list where a different desired motion is associated with each of at least some of the possible objects of the given type.

6. The control system according to claim 1, wherein the image analyzing module determines a position of the object on the image and compares the position to a desired position, and the motion calculator determining the desired motion of the device such as to change the position to correspond to the desired position.

7. The control system according to claim 6, wherein the object is moving, and the desired motion of the device allows the device to follow the object.

8. The control system according to claim 1, wherein the yaw and pitch controllers are PID controllers.

9. A robotic device for navigating in at least a liquid medium, the robotic device comprising:
    a body;
    legged propulsion system having a series of legs external of the body, each of the legs being driven by an actuator and mounted to the body for pivotal movement about a. respective transverse axis, each of the legs being operable to at least oscillate relative to the body about the respective transverse axis such that interaction between the legs and the liquid medium produces propulsive forces that displace the robotic device within the liquid medium; and
    a control system including at least one sensor providing data about an environment of the device, tire control system using data thin the at least one sensor to determine a desired motion of the robotic device, a motion calculator of the control system including a controller which calculates a required displacement necessary to achieve said desired motion, wherein the controller is an annular controller which includes at least a yaw controller calculating a required yaw of the device and a pitch controller calculating a required pitch of the device, the desired motion including an angular displacement having the required yaw and the required pitch, the control system determining a corresponding required leg motion of each of the legs to produce the required displacement and therefore said desired motion, and actuating the actuators such as to displace each of the legs in accordance with the corresponding required leg motion.

10. The robotic device according to claim 9, wherein the desired motion of the device includes one of movement in at least one of six degrees of freedom and station keeping.

11. The robotic device according to claim 9, wherein the desired motion includes a series of at least two consecutive steps, each step including one of movement in at least on of six decrees of freedom and station keeping.

12. The robotic device according to claim 9, wherein the at least one sensor includes a visual sensor retrieving an image of an environment of the device. the control system determining a presence of an object of a given type in the image. determining an identity of the object from a given list of possible objects of the given type, and determining the desired motion associated with the identity. of the object in the list.

13. The robotic device according to claim 9, wherein the at least one sensor includes a visual sensor retrieving an image of an environment of the device. the control system determining a presence or an object of a given type in the image, determining a position of the object on the image and comparing the position to a desired position, and determining the desired motion of the device such as to change the position to correspond to the desired position.

14. The robotic device according to claim 9, wherein the at least one sensor includes at least one of a visual sensor and an inertial sensor.

15. The robotic device according to claim 9, wherein each of the legs is also operable to rotate about the respective transverse axis such that interaction between the legs and a solid medium allows the robotic device to move on the solid medium.

16. An amphibious robotic device comprising:

a body;

a legged propulsion system having a series of legs external of the body, each of said legs being driving by an actuator and mounted to the body for pivotal movement about a respective transverse axis in one of at least a swimming mode and a walking mode said legs being configured to oscillate relative to the transverse axis in said swimming mode when the device is in a liquid medium such that interaction between said legs and the liquid medium provides propulsive forces that displace the vehicle body with a desired motion within the liquid medium, said legs being configured to rotate relative to the transverse axis in said walking mode when the device is on a solid medium such that interaction between said legs and the solid medium provides propulsive forces that displace the vehicle body in a desired direction on the solid medium, and wherein each of said legs defines at least two members pivotally interconnected to relatively pivot about a pivot axis parallel to the respective transverse axis, and each legs includes an elastic material extending throughout the members and providing resistance to a relative pivoting motion of the members about the pivot axis such as to allow the legs to support a weight of the body upon walking on the solid medium; and a control system having a least one sensor operable to detect with which of the liquid medium and the solid medium the robotic device is interacting and a leg controller synchronously operating said legs in either one of the swimming mode and the walking mode based on the detected medium, the control system including a motion calculator having an angular controller operative at least when the less operating in said swimming mode, the angular controller calculating a required angular displacement of the robotic device necessary to achieve said desired motion.

17. The amphibious robotic device according to claim 16 wherein the at least one sensor includes an inertial sensor.

18. The amphibious robotic device according to claim 16, wherein the resistance to the relative pivoting motion of the members increases as the members pivot away from an aligned position.

19. A robotic device for navigating in at least a liquid medium, the robotic device comprising:

a body;

a legged propulsion system having a series of legs external of the body, each of said legs being driven by an actuator and mounted to the body for pivotal movement about a respective transverse axis, earn of the legs being operable to at least oscillate relative to the body about the respective transverse axis such that interaction between the legs and the liquid medium produces propulsive forces that displace the robotic device within the liquid medium; and a control system allowing the robotic device to perform a station keeping operation by computing a desired thrust at each legs along a yaw axis and a roll axis of the device, combining the desired thrust along the yaw and roll axes to determine a selected thrust angle and thrust magnitude rotating each of the legs at a rate generating a pressure drag consistent with the desired thrust when a difference between the selected thrust angle and a current leg angle is greater than a given angle value, and increasing an oscillation amplitude of each of the legs up to the thrust magnitude when the difference between the selected thrust angle and the current leg angle is at most the given angle value.

20. The robotic device according to claim 19, wherein the control system limits die rang of thrust angle for each lea to a region of 180° and gradually moves each of the legs to a stand-by range of 90° located within the thrust angle range when a demanded thrust for the leg reaches zero.

21. A device for selectively navigation on a solid medium and in a liquid medium, the device comprising:

a body; and a series of legs attached to the body to rotate about a respective rotational axis extending transversely to the body, each leg including at least one rigid frame extending in a plane substantially perpendicular to the respective rotational axis and a flexible member disposed substantially perpendicular to the at least one rigid frame, the device being propelled, on the solid medium through a rotational motion of each leg about the respective rotational axis causing intermittent engagement of the at least one rigid frame with the solid medium, and the device being propelled in be liquid medium through an oscillatory motion of each leg about the respective rotational axis causing the flexible member to produce a propulsive force through interaction thereof with the liquid medium, and wherein the at least one rigid frame of each legs defines at least two members pivotally interconnected to relatively pivot about a pivot axis parallel to the respective rotational axis, and the flexible member of each leg includes an elative material attached to the at least one frame and providing resistance to a relative pivoting motion of the members about the pivot axis such as to allow the legs to support a weight of the body upon propulsion on the solid medium.

22. The device according to claim 21, wherein the resistance to the relative pivoting in motion of the members increases as the members pivot away from an aligned position.

* * * * *